UNITED STATES PATENT OFFICE.

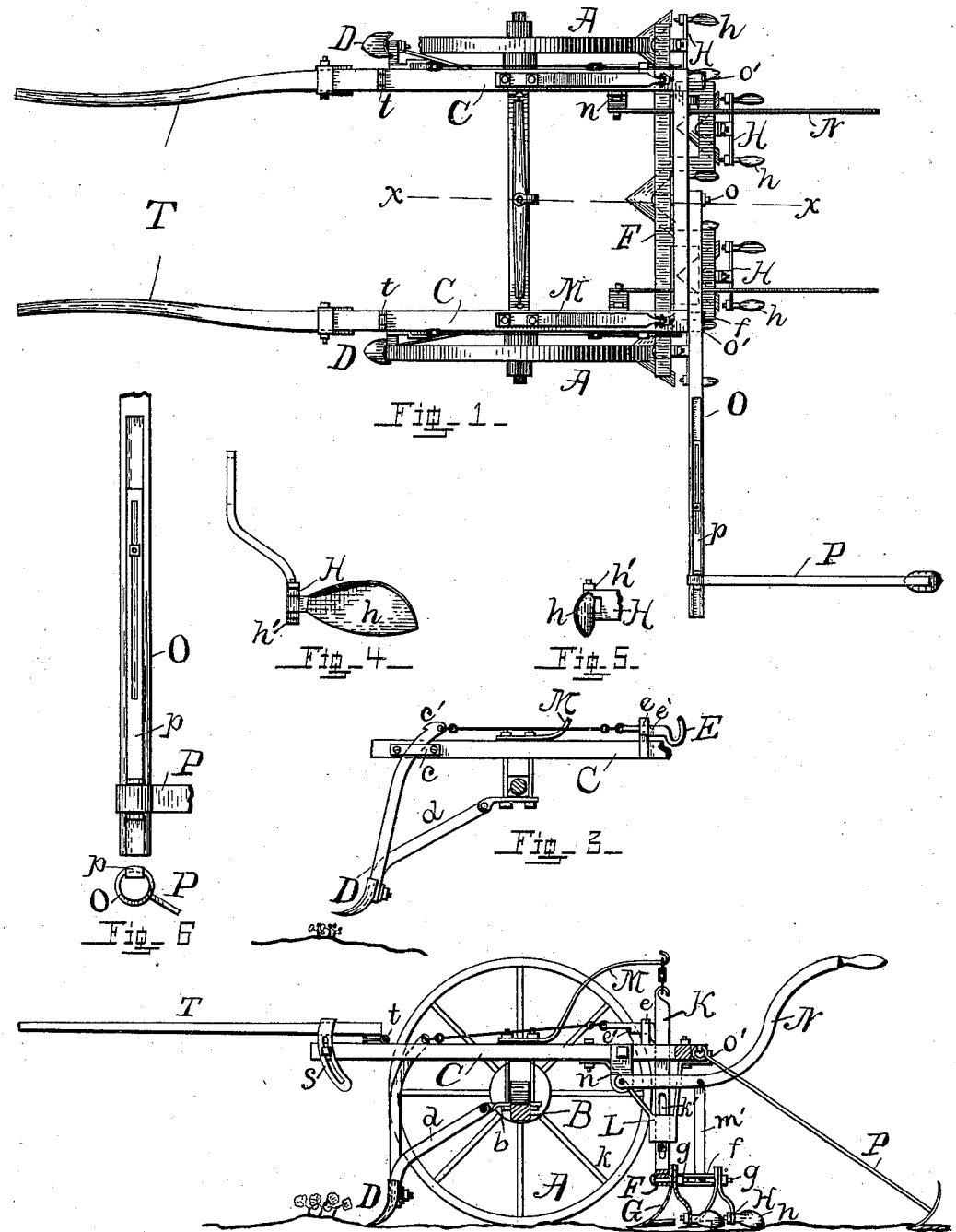

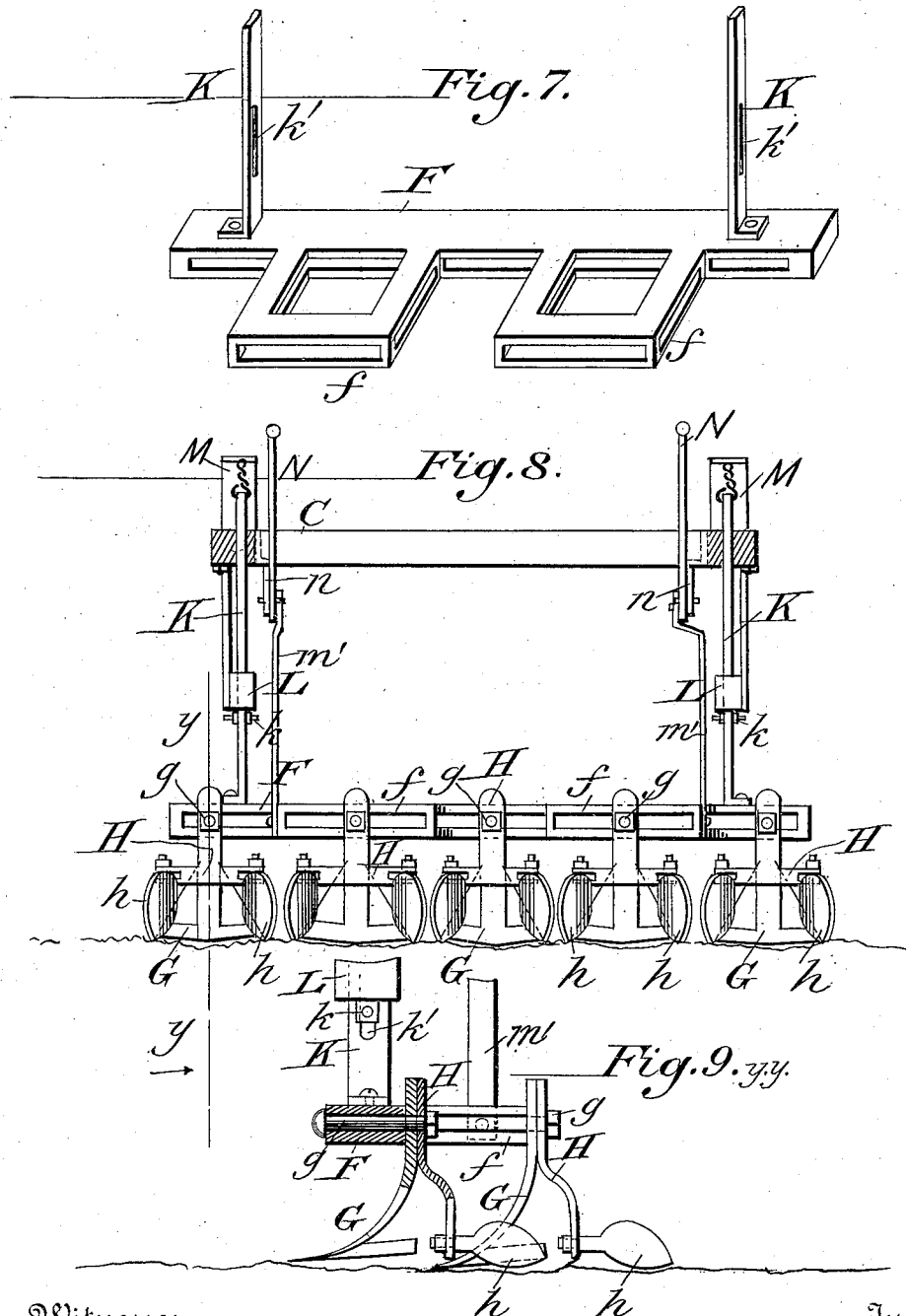

JOHN B. AMMONS, OF ATLANTA, GEORGIA, ASSIGNOR OF TWO-THIRDS TO GEORGE W. REARDON, OF SUMTER, SOUTH CAROLINA, AND DAVID P. MORRIS, OF ATLANTA, GEORGIA.

COTTON-CHOPPER.

SPECIFICATION forming part of Letters Patent No. 376,274, dated January 10, 1888.

Application filed September 1, 1887. Serial No. 248,552. (No model.)

*To all whom it may concern:*

Be it known that I, JOHN B. AMMONS, a citizen of the United States, residing at Atlanta, in the county of Fulton and State of Georgia, have invented a new and useful Cotton-Chopper; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the class of choppers that are drawn across the rows of cotton-plant sown in drills, by reason of which crossing the rows the hoes or plows are caused to cut out a portion of each row.

The invention consists of a series of hoes or plows, each of which is provided with a following scraper and a set of teeth formed somewhat like a mold-board, as usually applied to plows, and which I will call a "harrow," as their function is to put dirt to the plants after the plows and scrapers shall have passed and performed their functions, as will be hereinafter described.

A frame and wheels carry the operative parts of the machine, having plows to level the track for the wheels, and a marker to lay out a track for the horse to follow in the next crossing of the field, all of which will be hereinafter fully described in detail, and the parts thought to be new pointed out in the claims.

In the accompanying drawings, Figure 1 is a plan showing the wheels and axle, the thills, the plows that make the tracks for the wheels, the chopping-plows, the scrapers, and the harrow, the marker, and other details. Fig. 2 is a section on the line $x\ x$, Fig. 1, except so far as it relates to the marker and its supporting-arm, which are not shown in section. Fig. 3 is a view from the outside of a portion of the frame, more clearly showing the attachment and adjustment of the plow in front of the wheel. Fig. 4 shows a modification in the attachment of the harrows to the scraper. Fig. 5 is a rear view of Fig. 4. Fig. 6 is a top view, somewhat enlarged, of the arm that carries the marker. Fig. 7 is an enlarged perspective view of the beam to which the harrow-teeth and plows are attached. Fig. 8 is a rear elevation showing the plows and harrows in position. Fig. 9 is a longitudinal section on line $y\ y$, Fig. 8.

In the figures like reference-marks indicate corresponding parts in the several views.

The wheels A and axle B carry the frame C. Pivoted to the straps $b$, and thereby attached to the axle, are the arms or braces $d$ of the plow-standards D. The standards D project upwardly and pass under the straps $c$, and have hooks $c'$, that by catching on the strap will prevent the depression of the plows beyond the desired point. The plows are raised by pulling the handles E, which, through their connections with the upwardly-projecting free ends of the standards, will raise the plows. The handles E slide through brackets $e$, attached to the sides of the frame, and have an offset, $e'$, to hold them when pulled back, as shown in Fig. 3. The functions of these plows will be hereinafter described.

At the rear of the machine is a horizontal frame, F, which is preferably made of two flat bars of iron, leaving a nearly continuous opening from end to end, and has the offset $f$ for the purpose of carrying each alternate plow somewhat back of the others. The plows G are attached to the frame by the bolts $g$, as is best shown in Fig. 2. By these bolts $g$ are also attached the scrapers H. In each end of the scrapers H are the harrows $h$, which are curved in the manner shown to throw the dirt outwardly from each pair and force a little dirt up to the plant. The beam F is carried by the sliding bars K, which pass through the frame and the brackets L. The beam and sliding bars are supported by the springs M, and are prevented from being raised too high by the bolts $k$ in the slots $k'$. When necessary to depress the plows, it is done by depressing the lever N, which is pivoted on the brackets $n$, and is connected to the beam F by the connecting-rod $m'$. If the condition of the ground requires it, the springs M may be disconnected and the bolts $k$ put in the upper end of the slots above the brackets, and hold the plows at their lowest position, in which case they could be raised by the lever N in case of stony ground.

The object of the machine being to cut out portions of the row, leaving other portions, the portion left, of course, will be governed by the distance between the plows, which distance may be regulated by changing the position of the plows on the beam F. It is never necessary to change the center plow, and some part of one plow should always be behind each wheel to chop out the cotton over which the wheel runs, the plows being sufficiently wide to permit any necessary adjustment without being moved either way entirely from behind the wheels.

To the center of the rear of the frame C is pivoted the arm O by the bolts o. Near the outer end of the arm O is the marker P, which is adjusted in its distance from the machine by the slotted slide p. (Best shown in Figs. 1 and 6.) The marker P is dragged behind the machine and marks out a trail for the horse in crossing the field the next time, to insure a proper and uniform distance between the cut being made and the one made preceding it. This marker is sustained by the hooks o', and may be turned to either side of the machine, as required by the fact that the machine turns at the end of each cut and returns, it always being necessary that it shall mark on the side of the machine toward where the next cut is to be made. The marker P has two points, and, swiveling on the arm O, will by its own weight drag on the ground and perform its function. The frame C should always run about level. Therefore, to accommodate horses of different heights, I hinge the thills T to the frame by the hinges t and adjust them by means of the slotted straps S. (Shown in Fig. 2.)

Cotton is usually planted in drills somewhat higher than the intervening ground, for which reason, for the purpose of furnishing a level track for the wheels and removing any obstruction from in front of them to prevent the plows from varying in height as the ground varies, I place the plows B in front of the wheels at such a height as will make a continuous level track for the wheels. This track will also prevent any sidewise sliding of the machine.

In Figs. 1 and 2 the harrows are shown as having shanks that pass through the scrapers H, with nuts on the other side for fastening them in place. In Figs. 4 and 5 is shown a modification of this part of the device, which is the attachment of the harrows to the scrapers by hinges, one member of the hinge being the front end of the harrow-tooth and the others being the forked end of the scraper, through all of which pass the bolts $h'$. By means of this form of attachment the harrows may be turned horizontally to any angle to the scrapers at which they may be fastened by the bolts $h'$.

Having thus described my invention, what I claim as new, and desire to secure by Letters Patent of the United States, is—

1. In a cotton-chopper, the combination of the frame C, the axle-box, the plow-standard D, having hooks $c'$, the arm or brace $d$, connecting the plow with the axle-box, the strap $c$, the notched handle E, having offset $e'$, the rod connecting said standard and said handle, and the bracket $e$, all substantially as specified.

2. In a cotton-chopper, the combination of the frame C, the spring M, the sliding bar K, the bracket L, in which said bar slides, the beam F, attached to said bar, the handle N, the rod $m'$, which attaches said beam to said handle, the plows G, scrapers H, and harrows $h$, said plows, scrapers, and harrows being attached to said beams, all substantially as set forth, and for the purpose specified.

In testimony whereof I affix my signature in presence of two witnesses.

JOHN B. AMMONS.

Witnesses:
A. P. WOOD,
A. A. WOOD.